T. E. BARNUM.
MOTOR CONTROLLER.
APPLICATION FILED JULY 23, 1917.

1,391,295.

Patented Sept. 20, 1921.
2 SHEETS—SHEET 1.

Inventor
Thomas E. Barnum
By Frank A. Hubbard
Attorney

T. E. BARNUM.
MOTOR CONTROLLER.
APPLICATION FILED JULY 23, 1917.

1,391,295.

Patented Sept. 20, 1921.
2 SHEETS—SHEET 2.

Inventor
Thomas E. Barnum
By Frank H. Hubbard
Attorney

UNITED STATES PATENT OFFICE.

THOMAS E. BARNUM, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,391,295.  Specification of Letters Patent.  Patented Sept. 20, 1921.

Application filed July 23, 1917. Serial No. 182,184.

*To all whom it may concern:*

Be it known that I, THOMAS E. BARNUM, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to controllers for polyphase alternating current motors and more particularly to starting devices therefor.

One of the objects of the invention is to provide a simplified controller for starting a polyphase motor by connecting the same to a supply circuit through a plurality of compensator windings and then connecting the motor to the supply circuit exclusive of said windings and inclusive of suitable overload protective means.

A further object is to provide a simplified controller for effecting the aforesaid commutations and for effecting at will complete disconnection of the motor, the compensator windings and the overload means from the supply circuit, for safety in making inspection, adjustments, etc.

A further object is to provide a controller wherein the contact and circuit arrangement is such as to obviate the necessity for circuit making and breaking means between the motor and intermediate taps on the compensator windings and to enable curtailment of the number of insulated movable contact members or groups thereof to a number not exceeding the number of lines of the supply circuit.

Other objects and advantages of the invention will hereinafter appear.

The accompanying drawings illustrate certain embodiments of the invention and the same will now be described, it being understood that the invention is susceptible of embodiment in other forms without departing from the scope of the appended claims.

Figure 1:
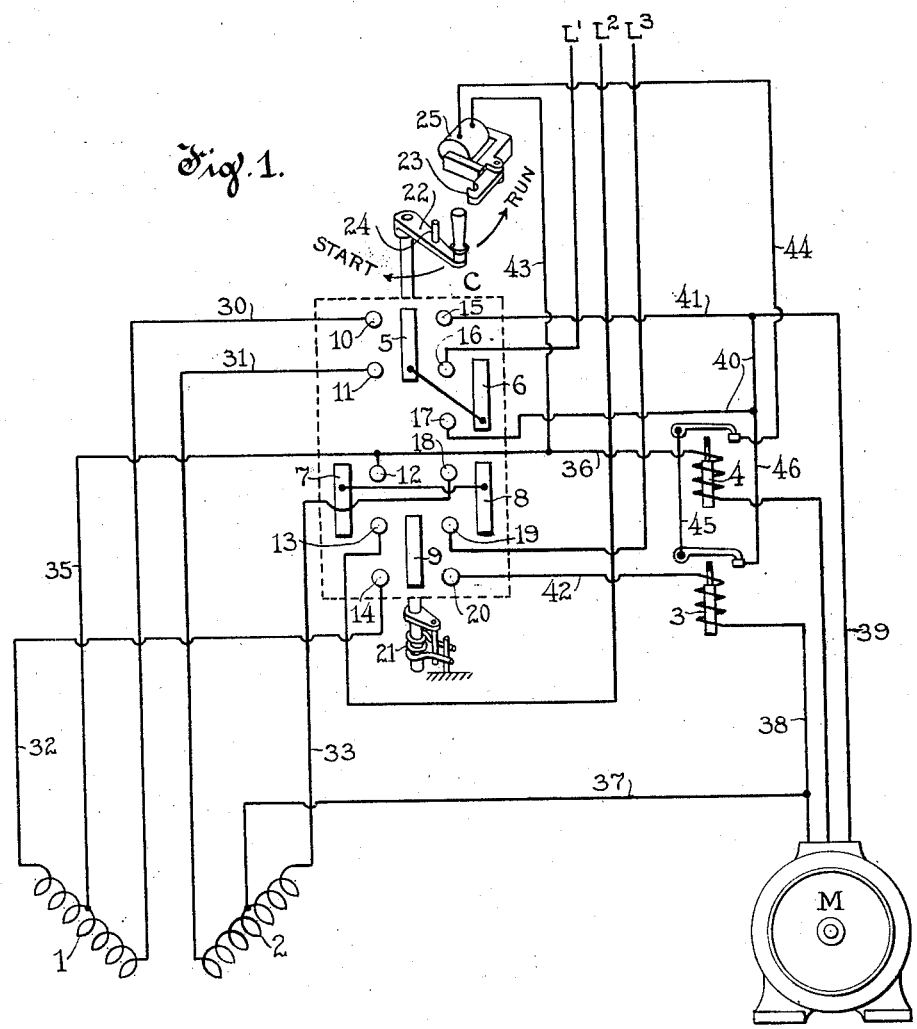
Figure 1 is a schematic and diagrammatic view of a controller for a three phase motor.

Referring to Fig. 1, the same shows a three phase alternating current motor M, a supply circuit $L'$, $L^2$ and $L^3$ therefor, compensator windings 1 and 2 to be connected in circuit for starting, overload relays 3 and 4 to be connected in circuit for running, and a controller C for selectively establishing starting and running connections.

The controller is schematically illustrated as of the drum type and provided with electrically connected drum segments 5 and 6, electrically connected drum segments 7 and 8 insulated from the former and a drum segment 9 insulated from all the remaining segments. Further, the controller is provided with two series of stationary contacts 10 to 14 and 15 to 20, the arrangement of contacts and segments being as follows:

With the controller drum in an intermediate position, as illustrated, the segments disengage all contacts, whereas when the drum is moved clockwise to starting position, segments 5, 6, 8 and 9 respectively engage and bridge the pairs of contacts 10—11, 16—17, 18—19 and 13—14. On the other hand, when the controller drum is moved counter-clockwise to running position, segments 5, 7 and 9 respectively engage and bridge the pairs of contacts 15—16, 12—13 and 19—20. The controller drum is provided with a centering spring 21 to return the same from opposite extreme positions to neutral position and is operable against the bias of said spring by a handle 22 and releasably lockable in running position by the latch 23 adapted to engage a pin 24 on said handle. The latch 23 has a controlling electromagnet 25 and is dependent upon energization of said electromagnet for retaining the drum in running position, said electromagnet being controlled as hereinafter set forth by the overload relays 3 and 4.

The circuit arrangement is as follows: Contacts 10 and 11 are respectively connected by conductors 30 and 31 to the adjacent terminals of the compensator windings 1 and 2, while contact 16 is connected to line $L'$ and thus when the controller is moved to starting position segments 5 and 6 serve to connect the compensator windings together and to line $L'$. Also, the compensator windings 1 and 2 are respectively connected by conductors 32 and 33 to contacts 14 and 18 which contacts, in the starting position of the controller, are respectively bridged with contacts 13 and 19 and said last two mentioned contacts are respectively connected with supply lines $L^2$ and $L^3$. Thus, in starting position of the controller, the compensator winding 1 is connected between supply lines $L'$ and $L^2$, while compensator winding 2 is connected between supply lines $L'$ and $L^3$. Moreover, the winding 1 has an intermediate tap permanently connected by conductors 35 and 36 to one terminal of the motor and the winding 2 has an intermediate tap permanently connected by conductors 37 and 38 to a second terminal of the motor, while the third terminal of the motor is connected by conductors 39 and 40 to contact 17, which in starting position is bridged with the line connected contact 16. Accordingly the connection of the compensator winding to the supply circuit as described provides for starting of the motor by the so-called V connections.

On the other hand, contact 15 is connected by conductors 41 and 39 to one terminal of the motor and in running position said contact is bridged by segment 5 with contact 16 and thus connected to line $L'$. Contact 12 is connected by conductor 36 to a second terminal of the motor through the winding of overload relay 4 and in running position of the controller it is bridged by segment 7 with contact 13 and thus connected to line $L^2$. Contact 20 is connected by conductors 42 and 38 to the third terminal of the motor through the winding of overload relay 3 and in running position of the controller it is bridged by segment 9 with contact 19 and thus connected to line $L^3$. Accordingly the establishment of such connections provides for direct connection of the motor to the supply circuit for running and for inclusion of the windings of the overload relays.

The circuit of the electromagnet 25 is, in running position of the controller, traceable from line $L^2$ to contact 13 thence through segment 7 to contact 12, by conductors 36 and 43 through said electromagnet, by conductor 44 through overload relay 4, by conductor 45 through overload relay 3, by conductor 46 to line $L'$. Accordingly so long as the relays remain inert the electromagnet will retain the latch 23 in a position to lock the controller in running position, whereas response of either relay will deënergize said electromagnet thereby releasing the controller for return to neutral position under the tension of spring 21.

As will thus be apparent, starting and running connections may be progressively and selectively established by first throwing the controller in a clockwise direction and then in a counter-clockwise direction, whereas the motor may be stopped and entirely disconnected from circuit, together with the compensator windings and overload coils by return of the controller to neutral position.

Figure 2:
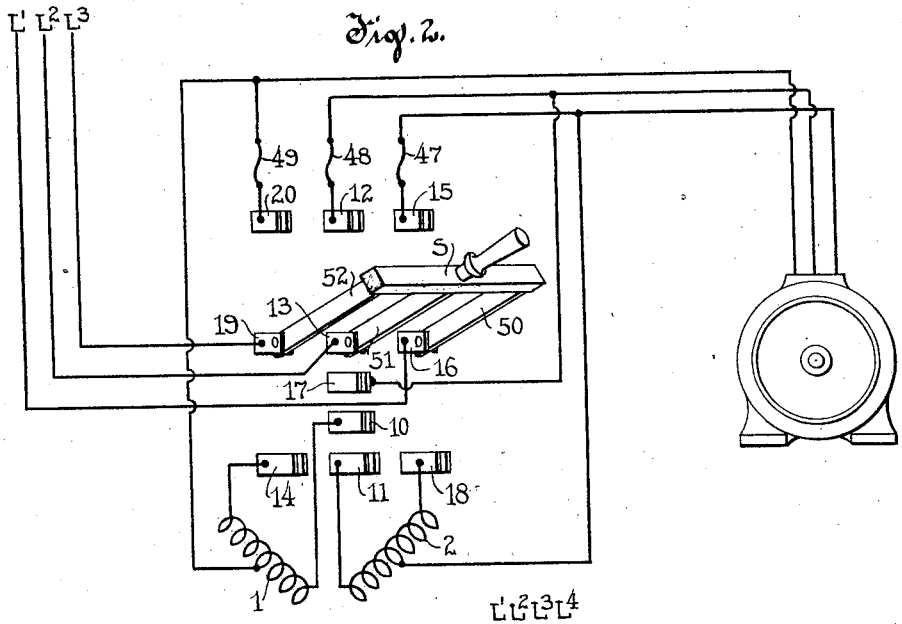
Fig. 2 is a schematic and diagrammatic view of a modified form of controller for a three phase motor; and, Fig. 3 is a schematic and diagrammatic view of a controller for a four wire, two phase motor.

Referring now to Fig. 2, the same shows a motor of the same type as that shown in Fig. 1 and a knife switch S for establishing substantially the same circuit connections therefor as those above described. Further, this figure shows fuses 47, 48 and 49 for inclusion in the running connections in lieu of relays 3 and 4 of Fig. 1. The knife switch is of the double throw type and provided with blades 50, 51 and 52 insulated from one another. Further, regarding the blade supporting clips of this switch as contacts, said switch is provided with the same number of stationary contacts as the controller shown in Fig. 1, and the former contacts being connected in circuit in the same relation as the latter contacts, they have been given the same reference numerals. As in Fig. 1, the contacts 16, 13 and 19 are respectively connected to lines $L'$ $L^2$ and $L^3$ thereby connecting the switch blades 50, 51 and 52 to said lines respectively. Also, as in Fig. 1, contacts 10 and 11 are respectively connected to the adjacent terminals of compensator windings 1 and 2, while contact 17 is directly connected to one terminal of the motor and all of these contacts are arranged to be engaged and bridged by the blade 51 when the switch is thrown downwardly. Also, when the switch is thrown downwardly the blades 50 and 52 respectively engage contacts 18 and 14 which, as in Fig. 1, are respectively connected to the compensator windings 1 and 2. Thus downward throw of the switch establishes the same compensator connections as those described in connection with Fig. 1, except that in this instance the compensator winding 1 is connected between lines $L'$ and $L^2$ while winding 2 is connected between lines $L^2$ and $L^3$. Also, the intermediate contacts of the compensator windings are permanently connected to the motor as before, so that the same provisions are made for starting. On the other hand, the contacts 15, 12 and 20 which, as in Fig. 1, are respectively connected to the three motor terminals, are arranged for engagement by the blades 50, 51 and 52 respectively when the knife switch is thrown to its upper extreme position. This provides for the same running connections as those above described except for the inclusion of the fuses in lieu of the overload windings and when the knife switch is opened it entirely disconnects the motor and compensator windings and fuses from circuit just as in the case of the controller shown in Fig. 1.

Figure 3:
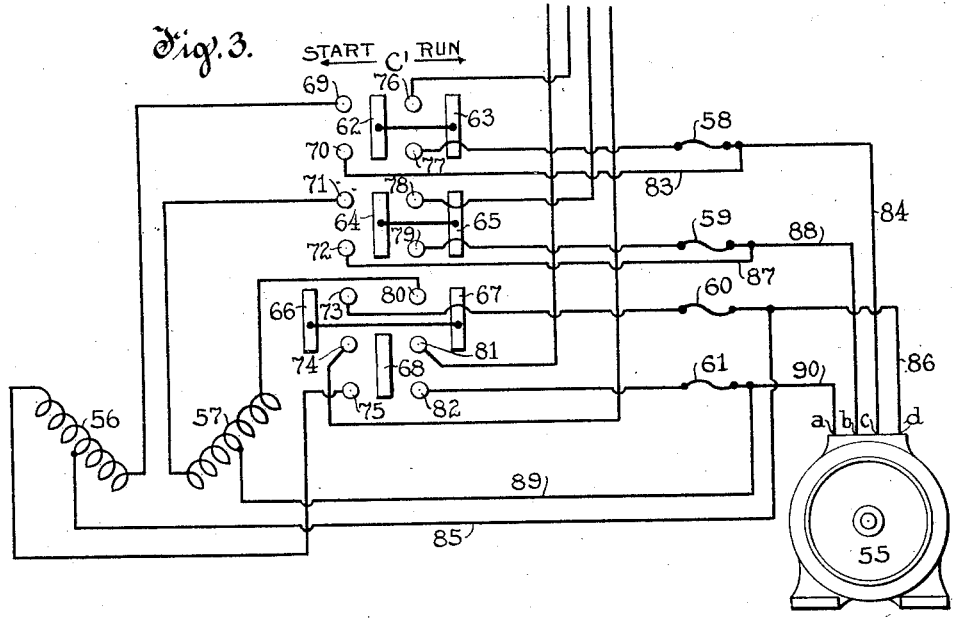

Referring to Fig. 3, the same shows a two phase alternating current motor 55, a four wire, two phase supply circuit $L'$, $L^2$, $L^3$ and L⁴ therefor, two compensator windings 56 and 57, fuses 58, 59, 60 and 61 and a drum type controller C'.

The controller C' is schematically illustrated as provided with electrically connected drum segments 62—63, 64—65, 66—67, these pairs of segments being insulated from one another and a segment 68 insulated from all others. Also, the controller is shown as provided with two series of contacts 69 to 75 and 76 to 82, the arrangement of contacts and segments being such that the drum is movable clockwise to starting position and counter-clockwise to running position. In the former position segments 62, 63, 64, 65, 67 and 68 respectively engage and bridge the pairs of contacts 69—70, 76—77, 71—72, 78—79, 80—81 and 74—75. In the running position segments 62, 64, 66 and 68 respectively engage and bridge the pairs of contacts 76—77, 78—79, 73—74 and 81—82.

The circuit arrangement is as follows: The compensator winding 56 has its end terminals respectively connected to contacts 69 and 75 and in starting position contact 69 is connected through segments 62 and 63 and contact 76 to line L², while contact 75 is connected through segment 68 and contact 74 to line L⁴. Also, contact 69 is connected by segment 62 to contact 70 and by conductors 83 and 84 to terminal c of the motor while the compensator has an intermediate tap connected by conductors 85 and 86 to terminal d of the motor and hence the connections described provide for completion of one phase of the motor circuit. The other compensator winding 57 has its end terminals respectively connected to contacts 71 and 80 and in starting position contact 71 is connected through segments 64 and 65 and contact 78 to line L³, while contact 80 is connected through segment 67 and contact 81 to line L'. Also, contact 71 is connected through segment 64 to contact 72, by conductors 87 and 88 to terminal b of the motor, while the compensator winding 57 has an intermediate tap connected by conductors 89 and 90 to terminal a of the motor. Hence these connections provide for completion of the second phase of the motor circuit.

On the other hand, the motor terminals a, b, c, and d are respectively connected each through one of the fuses to contacts 82, 79, 77 and 73 and accordingly in running position the motor will be connected directly to the supply lines through the fuses, the effective line connections of the compensator windings being interrupted.

Thus, regardless of whether the motor be two phase or three phase, the number of poles of the control switch may be so curtailed as not to exceed the number of lines of the supply circuit and by providing the control switch with one pole for each line of said circuit, the motor, compensator winding, and fuses or other overload means may all be completely disconnected from the supply circuit.

Moreover it is to be understood that the invention is not limited to the use of two compensator windings, and in this connection it may be stated that it has been found to be readily applicable to a three phase motor having three compensator windings, one for each phase thereof.

What I claim as new and desire to secure by Letters Patent is:

1. The combination with a polyphase alternating current motor, a plurality of compensator windings and a polyphase supply circuit, of a plurality of contacts and coöperating members insulated to provide a number of poles not exceeding the number of lines of said supply circuit and circuit connections whereby said contacts and coöperating members in one relation provide for connection of said windings to said supply circuit and completion of the circuit of said motor inclusive of said windings and in another relation for disconnection of said windings from said supply circuit and connection of the motor directly to said supply circuit.

2. The combination with a polyphase alternating current motor, a plurality of compensator windings and a polyphase supply circuit, of a plurality of contacts and coöperating members, insulated to provide a number of poles not exceeding the number of lines of said supply circuit, and circuit connections whereby said contacts and coöperating members provide for completion of circuit between said motor and said supply circuit either inclusive or exclusive of said compensator windings, and further provide for complete disconnection of said motor and compensator windings from said supply circuit.

3. The combination with a polyphase alternating current motor, a plurality of compensator windings, overload means and a polyphase supply circuit, of a plurality of contacts and coöperating contact members insulated to provide a number of poles not exceeding the number of lines of such supply circuit and circuit connections whereby said contacts and coöperating members in one relation provide for connection of said windings to said supply circuit, and completion of the circuit of said motor inclusive of said windings and exclusive of said overload means and in another relation for disconnection of said windings from said supply circuit and connection of said motor directly to said circuit inclusive of said overload means.

4. The combination with a polyphase alternating current motor, a plurality of compensator windings, overload means and a polyphase supply circuit, of a plurality of contacts and coöperating contact members insulated to provide a number of poles not exceeding the number of lines of said supply circuit and circuit connections whereby said contacts and coöperating members provide for completion of circuit between said motor and said supply circuit either inclusive of said compensator windings and exclusive of said overload means or vice versa and further provide for complete disconnection of said motor, compensator windings and overload means from said supply circuit.

5. The combination with a polyphase alternating current motor, a plurality of compensator windings and a supply circuit, of permanent connections between said motor and an intermediate tap on each of said compensator windings and a control device for selectively establishing connections between said motor and said supply circuit inclusive and exclusive of said compensator windings said control device comprising coöperating contacts and contact members, the latter being arranged in electrically independent groups in number not exceeding the number of lines of said supply circuit.

6. The combination with a polyphase alternating current motor, a plurality of compensator windings and a supply circuit, of permanent connections between said motor and an intermediate tap on each of said compensator windings and a control device for selectively establishing connections between said motor and said supply circuit inclusive and exclusive of said compensator windings, said device including contacts for interrupting all effective connections between said compensator windings and said supply circuit under the last mentioned conditions said control device comprising coöperating contacts and contact members, the latter being arranged in electrically independent groups in number not exceeding the number of lines of said supply circuit.

7. The combination with a polyphase alternating current motor, a plurality of compensator windings and a supply circuit, of permanent connections between said motor and an intermediate tap on each of said compensator windings and a control device for selectively establishing connections between said motor and said supply circuit inclusive and exclusive of said compensator windings, said control device being also operable to entirely disconnect said motor and compensator windings from said supply circuit said control device comprising coöperating contacts and contact members, the latter being arranged in electrically independent groups in number not exceeding the number of lines of said supply circuit.

8. The combination with a polyphase alternating current motor and polyphase supply circuit therefor, of a plurality of compensator windings, each having an intermediate tap permanently connected to said motor, a plurality of overload devices for different phases of the motor circuit, a contact member having a number of poles corresponding to the number of lines of said supply circuit, coöperating contacts and circuit connections whereby said motor may be connected to said supply circuit inclusive of said compensator windings and exclusive of said overload devices, or vice versa, and whereby all lines of said supply circuit may be disconnected from said motor and compensator windings.

9. The combination with a polyphase alternating current motor and a supply circuit therefor, of a plurality of compensator windings, each having an intermediate tap permanently connected to said motor, a double throw controller for selectively establishing starting connections for said motor inclusive of said compensator windings and running connections for said motor exclusive of said compensator windings, said controller having contacts and coöperating members providing a number of poles not exceeding the number of lines of said supply circuit, for establishment of both starting and running connections.

10. The combination with a polyphase alternating current motor and a supply circuit therefor, of a plurality of compensator windings each having an intermediate tap permanently connected to said motor, overload devices for said motor, a double throw controller for selectively establishing starting connections for said motor inclusive of said compensator windings and running connections for said motor inclusive of said overload devices, said controller having contacts and coöperating members providing a number of poles corresponding to the number of lines of said supply circuit, for establishment of both starting and running connections.

In witness whereof, I have hereunto subscribed my name.

THOMAS E. BARNUM.